March 31, 1964  J. J. KONIKOFF  3,127,243
RECOVERY OF POTABLE WATER FROM HUMAN METABOLIC WASTES
BY DISTILLATION AND OXIDATION OF THE RESULTING VAPORS
Filed Aug. 15, 1960
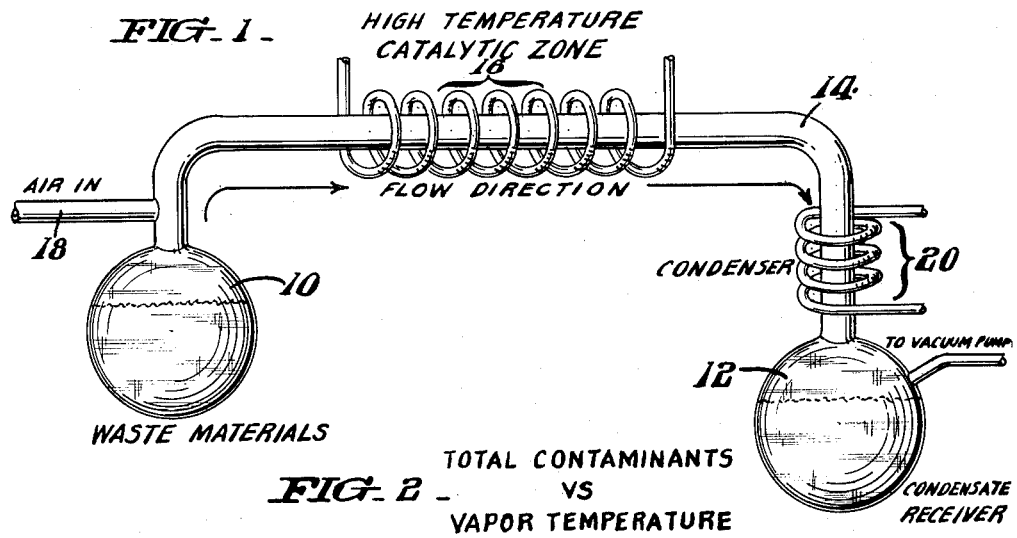
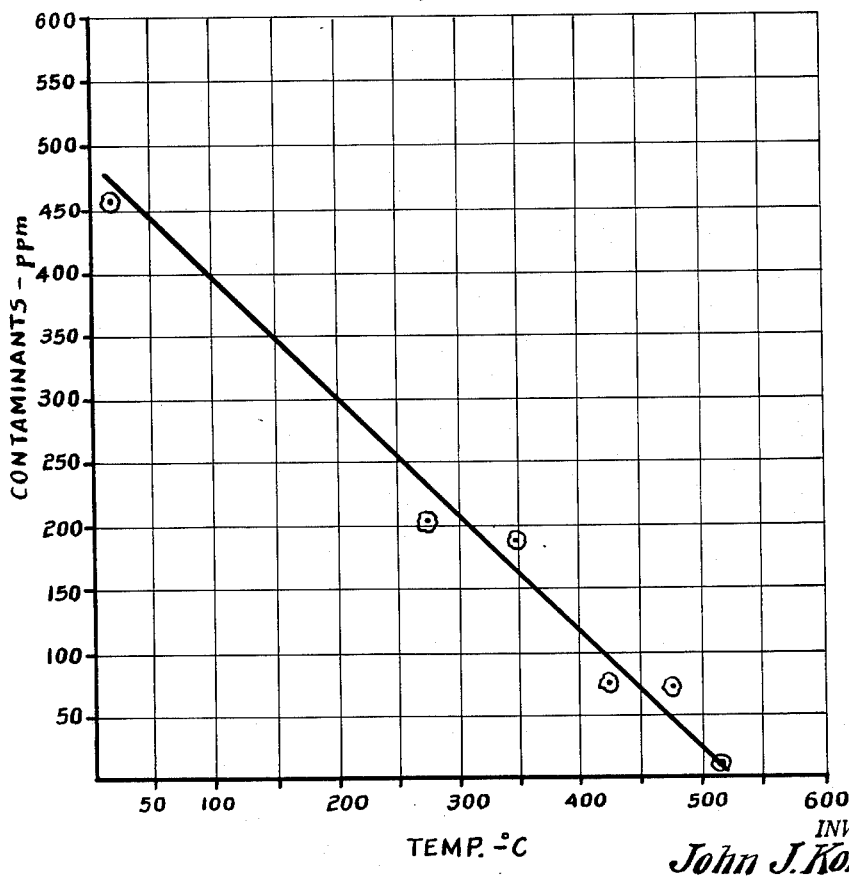
INVENTOR.
John J. Konikoff,
BY
Edward W. Hughes
ATTORNEY

United States Patent Office 3,127,243
Patented Mar. 31, 1964

3,127,243
RECOVERY OF POTABLE WATER FROM HUMAN METABOLIC WASTES BY DISTILLATION AND OXIDATION OF THE RESULTING VAPORS
John J. Konikoff, Philadelphia, Pa., assignor to General Electric Company, a corporation of New York
Filed Aug. 15, 1960, Ser. No. 49,491
7 Claims. (Cl. 23—204)

This invention relates to a method of extracting potable water from natural biological wastes.

The recovery of potable water from human metabolic waste is a problem whose solution will contribute to long term manned space flight. Simple calculations show the impracticality weightwise of storing sufficient quantities of water for extended flights. Hence, it becomes important to find sources of water that may, after suitable treatment, be used for drinking purposes.

Urine, because it contains about ninety-two percent water, becomes of immediate interest as a primary source of water. The text book, "Practical Physiological Chemistry," by Hawk, Oser and Summerson, 13th edition, published by Blakiston Company, Inc., New York, N.Y. (1954), lists dozens of constituents of urine, many of which occur only in the abnormal state. Most of these are organic and are present only in minute amounts. It is to be expected that some of even the most toxic (in the blood stream) of these would be detoxified when orally ingested. Yet in view of the lack of complete knowledge of body retention of these products—or the original constituent itself—it seems better to try to eliminate the question of potential toxicity by eliminating the substance.

Table I below lists the composition of a typical normal urine.

TABLE I

*Composition of a Typical Normal Urine*

[By weight in grams]

| | |
|---|---|
| Water | 1200.0 |
| Solids | 60.0 |
| Urea | 30.0 |
| Uric acid | 0.7 |
| Hippuric acid | 0.7 |
| Creatinine | 1.2 |
| Indican | 0.01 |
| Oxalic acid | 0.02 |
| Allantoin | 0.04 |
| Amino acid nitrogen | 0.2 |
| Purine bases | 0.01 |
| Phenols | 0.2 |
| Chloride as NaCl | 12.0 |
| Sodium | 4.0 |
| Potassium | 2.0 |
| Calcium | 0.2 |
| Magnesium | 0.15 |
| Sulfur, total, as S | 1.0 |
| Inorganic sulfates as S | 0.8 |
| Neutral sulfur as S | 0.12 |
| Conjugated sulfates as S | 0.08 |
| Phosphate as P | 1.1 |
| Ammonia | 0.7 |

For comparative purposes I have listed below in Table II the composition of a potable water following treatment, and delivered by the City of Philadelphia, Department of Water.

TABLE II

*City of Philadelphia, Water Department, Chemical and Physical Analyses, 1959, Plant Effluent to Distribution*

[All results in p.p.m. except pH]

| | Avg. |
|---|---|
| Turbidity | 0.0 |
| Color | 2 |
| Total solids | 243 |
| Total org. and AMN (N) | 0.18 |
| Nitrite (N) | 0.000 |
| Nitrate (N) | 1.26 |
| pH | 6.6 |
| Alkalinity | 35 |
| Sulfates ($SO_3$) | 70 |
| Chloride (Cl) | 18 |
| Total hardness | 143 |
| Iron (Fe) | 0.06 |
| Chlorine resid., total | 0.77 |
| Chlorine resid., free | 0.64 |

Fundamentally, there are both non-volatile and volatile materials contained in urine that require treatment for their elimination. The former are characterized by the salts, primarily sodium chloride, and by urea and pigments, and the latter principally by ammonia and phenols. Many of these materials are toxic to various degrees and, as such, should be eliminated. Unfortunately, no single method is known that will extract both types. Distillation alone is an ineffectual means for obtaining potable water from urine. Other experimenters have tried distillation both at atmospheric and reduced pressure. In general, the material produced was odorous, alkaline and contained many materials that made it unfit for human consumption. Further treatment, such as chlorination, ion exchange, or filtration improved the quality. A severe weight penalty would be incurred if the filter technique or the ion exchange process was relied upon. Use of chlorine alone was suitable only for destroying the pathogens that may exist. The odor and, in some cases, the color remained.

My present invention provides a method for producing potable water from man's metabolic wastes which is satisfactorily free from odor, taste, color, bacteria and known toxic materials. My method does not require a filtering operation nor the addition of chemicals, and thus has a long life span.

In summary, my method comprises the steps of vaporizing the biological wastes by vacuum or partial vacuum distillation, then subjecting the vapor to high temperature oxidation by passing it through or over a heated catalyst, preferably platinum, and then chilling the vapor to condense its water content.

My method takes advantage of the distillation technique for separating and leaving behind the non-volatile materials and color, and then, as a second stage, destroys the volatile materials by oxidizing them in the presence of a catalyst at high temperatures. The breakdown of relatively complex materials of unknown effects to simpler molecules is a major benefit of this technique.

My invention will be more clearly understood from the description which follows and from the drawing whereby:

FIG. 1 is a schematic flow diagram of my water recovery method, and

FIG. 2 is a graph showing the relationship between vapor temperature and contaminants.

Referring now to FIG. 1, the biological waste material (urine, or fecal matter, or perspiration, or respiration products, or any combination thereof) is placed in flask 10 which functions as the distillation or still pot. The potable water is collected as condensate in a condensate receiver 12. A tube 14 connects still pot 10 to condensate receiver 12. Condensate receiver 12 is connected to a vacuum pump (not shown). Thus, the entire system is at low pressure, for example, 60 millimeters (mm.) of mercury. A high temperature catalytic zone 16 is established for destroying by oxidation the volatile materials in the vapor passing from still pot 10 through tube 14. A very small amount of air is admitted at 18. The vapor from the high temperature catalytic zone 16 is passed through a condenser zone 20 and the condensate collected in receiver 12.

In one laboratory system which has been used to produce potable water from urine, still pot 10 is a three-necked around bottom five-liter flask, equipped with a mercury well thermometer, entrainer-capillary, mercury vacuum gage (A. H. Thomas) and flow meter (Brooks Sho-Rate 50), a preheater column 20 inches long, wrapped with 19 feet of Nichrome wire, led to the mullite tube used in the high-temperature furnace (Sentry size 2). Ten screens (30 x 80 mm.) of platinum catalyst (0.004" wire) were inserted into the tube. Condensation of the vapors was effected by a Liebig and then an Allyn condenser in series. A calibrated Kontes K–53500 adapter, for measuring condensation rate, was connected to the ice-salt cooled distillate receiver. A Welch Duo-Seal oil vacuum pump protected by a trap containing #4 Linde molecular sieve afforded the desired 60 mm. vacuum. A vacuum gage was placed between the pump and the trap to determine vacuum drop in the line. Two drops of capryl-alcohol in the still pot effectively prevented foaming. Temperatures of the vapor were measured by thermocouples (Chromel-Alumel, #20 gage) located at the inlet and outlet of the oxidizing furnace. The still pot was heated to boiling, 42° C. at the vacuum used, by a Glas-Col heating mantle controlled by a Variac. The raw material (urine) was obtained from a large number of normal male subjects. The individuals contributing were not made a matter of record nor were current status of health known other than the fact that they were well enough to come to work on the day the samples were collected. Collection was made during the same period (8:00 a.m. to 10:00) each day and the specific gravities of the collected urine samples were found to be very close (average sp. gr.=1.016). Except where mentioned, all samples were used within three hours after collection.

The recovered water is potable in accordance with U.S. Public Health Service Drinking Water Standards 1946, Reprint No. 2697, March 1956, U.S. Dept. of Health, Education and Welfare, Public Health Service.

A significant number of experiments were conducted to determine the feasibility of this technique. As reported earlier, urine samples were collected and within three hours were subjected to the purification technique.

In all cases, when operating at apparent optimum settings, the material was adjudged potable. The conditions for the runs are as follows:

| | |
|---|---|
| System pressure | 60 mm. Hg. |
| Temperature of distillate | 42° C. |
| Vapor temperature at furnace inlet | 300° C. |
| Vapor temperature at furnace outlet | 520° C. |
| Catalyst | 10 platinum gauze screens, each. |
| 30 x 80 mm., 0.004" wire | 18 gms. total weight. |
| Catalyst temperature | Approximately 1100° C. |
| Flow rate thru oxidizing zone | 175 ml./hr. |
| Air bleed rate | 0.2 c.f.h. |

Runs were made at various oxidizing temperatures (other parameters as above) in order that an apparent optimum be found. The outlet vapor temperature ranged from room temperature to about 520°. Results are shown on Table III below which is a tabulation of the water analyses of each of the samples.

TABLE III

*Comparison of Products of Vacuum Distilled Urine*

| | Raw urine | Distilled only | Oxidized in presence of catalyst at temperature of— | | | | |
|---|---|---|---|---|---|---|---|
| | | | 276° C. | 343° C. | 426° C. | 474° C. | 513° C. |
| $NH_3$ as N, p.p.m. | 5,000+ | 40 | 20 | 17.5 | 8 | 5.0 | 0.1 |
| Total hardness as $CaCO_3$, p.p.m. | interfr. | 2 | 1 | 1 | 1 | 1 | 2 |
| Chloride, p.p.m. | 9100 | 0.5 | 4.0 | 0.5 | 0.5 | 0.5 | 0.5 |
| pH | 9.00 | 9.90 | 9.50 | 9.80 | 9.30 | 9.45 | 6.80 |
| Nitrate as $NO_3$, p.p.m. | org. interfr. | 0.05 | .05 | .025 | .025 | 0.025 | 0.05 |
| Nitrite as $NO_2$, p.p.m. | 2,162 | 0 | + | 0 | 0 | 0 | 0 |
| Color units | 3,500 | 0 | 2 | 0 | 0 | 0 | 0 |
| Phenol, p.p.m. | 388.5 | 0 | 0 | 0 | 0 | 0 | 0 |
| Odor (intensity) | very strong rancid | strong rancid | strong rancid | strong | strong | faint | none |
| Phenolphthalein Alk as $CaCO_3$, p.p.m. | 5,800 | 160 | 48 | 56 | 14 | 14 | 0 |
| Methyl Orange Alk as $CaCO_3$, p.p.m. | 20,600 | 180 | 80 | 80 | 26 | 24 | 2 |
| Specific conductance (micromhos) | 50,000 | 72 | 49 | 39 | 27 | 20 | 3.4 |

FIG. 2 plots total contaminants against temperature of vapor after oxidizing. It is seen that, as the temperature rose, the contaminants decreased until at $T=513°$ C., potable water was obtained.

Runs were also made varying the air bleed rate. Basically, it was desired to determine the need for the air, secondly, the quantity. With operating conditions at apparent optimum, argon gas was flushed through the apparatus and then continually bled through the system, thus replacing all air. The resulting condensate was foul smelling and, in general, typical of sewage water. Running with no additional air other than that quantity normally in the apparatus, yielded potable water. Thus, it was demonstrated that only a small quantity of air was necessary. At a setting of 0.2 c.f.h. (the lowest that could be read on the flow meter) it was again found that the condensate was potable water. Hence, although the precise quantity of air is still not known, evidence shows that the quantity is small. Obviously, it is important to use the smallest amount required primarily because of the necessity for heating the air vapor mixture over the catalyst. The greater the air requirement, the higher the heat input.

Table I (the composition of a typical urine) indicated that the water content is equal to about 92 percent by weight. Invariably, recovered fractions equalled the theoretical water content. Potability of the condensate was not affected by the quantity of water recovered from the urine sample.

As a means of determining the capacity of the high-temperature oxidizing apparatus, one-half of a urine sample (1000 ml.) was distilled on one day and the remainder on a succeeding day after being stored at room temperature in the Pyrex still pot. Ammonia and pH values rose slightly as might be expected from the hydrolysis of the urea. In no case did the product approach the limits set by the U.S. Public Health Standards.

In another series of experiments, the continued addition of fresh urine and use of old (4 day) urine to the still pot residues dropped the pH values and ammonia values and raised the $NO_3$ value. During the last mentioned runs, additional platinum screens were added to the oxidizing furnace. Even though hydroylsis of urea occurred, the percentage of $NH_3$ converted to $NO_3$ also rose and probably contributed to the acidic character of the distillate. However, the condensate was still adjudged potable.

A further series of experiment indicated that the age, up to four days at room temperature storage, of urine also made no difference in the recovered product. Although some decomposition of the urine was evident in the still pot, the capacity of the oxidizing system was sufficient to destroy the volatiles that passed through.

The introduction of feces to the still pot effected no change in the oxidized product. Bacteriologically, chemically, and odorwise, the nonoxidized product of urine and feces was definitely not potable. Phenol value rose from zero (when oxidized) to 3 p.p.m., a totally unacceptable figure. Nitrite, pH, ammonia and total solids also showed rise to levels unacceptable for human consumption as shown in Table IV below. Attempts to take various fractions off to determine a usable portion were failures. However, oxidizing the products after vaporization resulted in the recovery of potable water.

TABLE IV

*Oxidizing Effect on Wastes*

| | Urine Only Oxidized | Urine and Feces Oxidized | Urine and Feces Distilled Only |
|---|---|---|---|
| Ammonia as N, p.p.m | 0.10 | 35 | 1,250 |
| Total Hardness | 2 | 0 | 1 |
| Chloride, p.p.m | 0.5 | 2 | 14 |
| pH | 6.8 | 8.8 | 10.10 |
| Nitrate as $NO_3$, p.p.m | 0.05 | 0.025 | 0.025 |
| Nitrate as $NO_2$, p.p.m | 0 | 0 | 138 |
| Color units | 0 | 0 | 7 |
| Phenol, p.p.m | 0.0 | 0.0 | 3.25 |
| Odor (intensity) | None | None | Strong Pungent |
| Total Solids | 14 | 54 | 168 |
| Phenolphthalein Alk, as $CaCO_3$, p.p.m | 0 | 20 | 4,670 |
| Methyl Orange Alk, as $CaCO_3$, p.p.m | #2 | 86 | 5,810 |
| Specific Conduct | 3.4 | 180 | 1,400 |

It will be seen that I have provided a system for obtaining, from man's biological wastes, drinking water which is free of odor, color, taste, known toxic materials, and bacteriological contamination.

It will also be seen that my method is simple, does not require filters or additives, and, assuming the utilization of the vacuum existing in space and of the solar energy existing in space, requires but small energy inputs.

A most important step in my method is the high-temperature oxidation of the vapor. The contents of the vapor are principally water, with less than one percent of ammonia ($NH_3$), very small quantities of creatinine, and perhaps some bacteria. When the vapor is passed through the high temperature platinum catalyst, the ammonia decomposes into water and nitrogenous oxides, non-toxic in the quantities present.

Attention is called to the fact that in my method the vapor per se is not heated. It is the catalyst which is heated, the vapor being passed through or over the catalyst. Perferably, a platinum gauze is used as the catalyst. In the laboratory experiments, the gauze was heated by wrapping it in resistance wire. However, a solar furnace may be used. The optimum operating temperature for the platinum gauze is in the range of from 800° C. to 1200° C. under the conditions described and in the apparatus illustrated.

The still pot may or may not be heated, since vaporization will occur as a result of the low pressure alone. Preferably, a small amount of heat is added, just enough to attain the desired flow rate.

Having thus described my invention, I claim:

1. The method of extracting potable water from human natural biological wastes comprising the steps of first vaporizing the more volatile constituents of the wastes, then oxidizing the contaminants found in the vapor by passing a mixture of air and the vapor over a heated platinum containing catalyst, and finally cooling the vapor to the temperature at which water condenses.

2. The method claimed in claim 1 further characterized in that the temperature of the vapor after passing it over the heated catalyst is between 400° C. and 600° C.

3. The method claimed in claim 2 further characterized in that the vaporizing is accomplished at substantially less than ambient pressure.

4. The method of extracting potable water from human metabolic wastes comprising the steps of first vaporizing the more volatile constituents of the wastes by vacuum distillation, then oxidizing contaminants in the vapor by passing the vapor over a heated platinum catalyst so that the temperature of the vapor is between 400° C. and 600° C., and finally condensing the oxidized vapor.

5. The method of extracting potable water from human biological wastes comprising the steps of first vaporizing the wastes by distillation, passing the distillation product through a high-temperature platinum containing catalytic zone to oxidize contaminates, and condensing the water content of the vapor.

6. The method of extracting potable water from human natural biological wastes comprising the steps of first vaporizing the more volatile constituents of the wastes, then oxidizing the contaminants found in the vapor by passing a mixture of air and the vapor over a platinum catalyst heated to a temperature between 800° C. and 1200° C., and finally condensing the vapor.

7. The method of extracting potable water from human metabolic wastes comprising the steps of first vaporizing the more volatile constituents of the wastes by vacuum distillation, and then oxidizing contaminants in the vapor by passing the vapor over a platinum catalyst heated to a temperature between 800° C. and 1200° C., and finally condensing the oxidized vapor.

References Cited in the file of this patent

UNITED STATES PATENTS

| 1,777,449 | Rath | Oct. 7, 1930 |
| 2,226,113 | Chastain | Dec. 24, 1940 |

FOREIGN PATENTS

| 830,964 | Great Britain | Mar. 23, 1960 |